Figure 1:
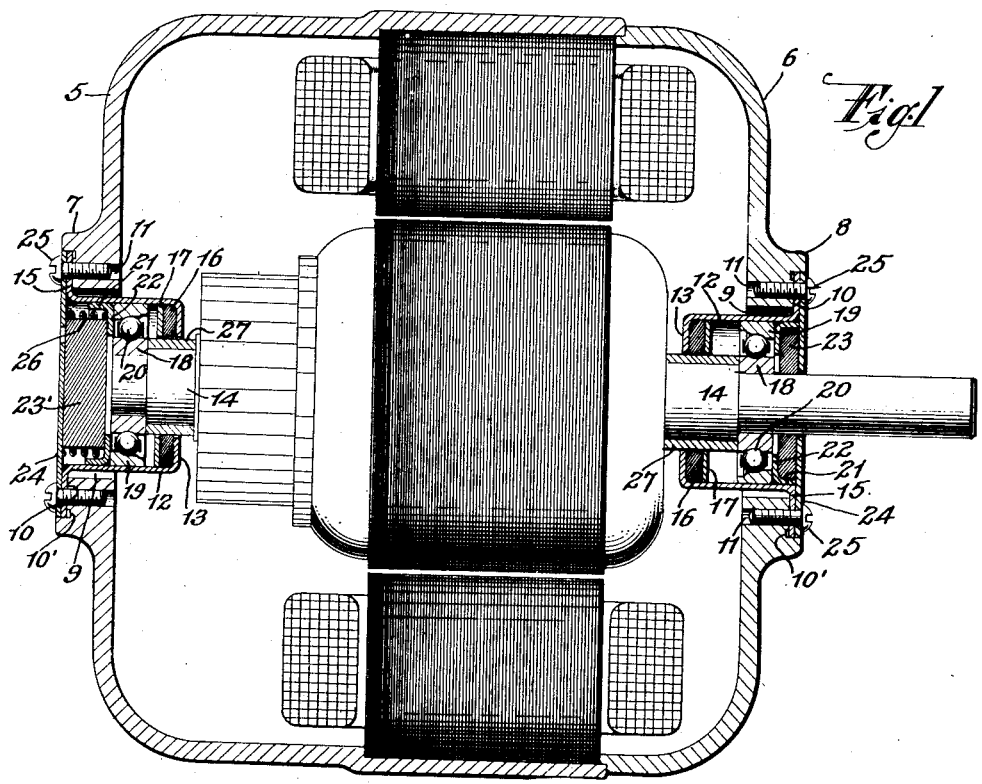

Feb. 6, 1923.

F. E. MUELLER 1,444,751

UNITARY SHEET METAL INCASED BEARING

Filed June 11, 1921

INVENTOR.
F. E. Mueller,
BY C. P. Goepel
ATTORNEY

Patented Feb. 6, 1923.

1,444,751

UNITED STATES PATENT OFFICE.

FREDERICK E. MUELLER, OF MOUNT VERNON, NEW YORK, ASSIGNOR TO THE NORMA COMPANY OF AMERICA, OF LONG ISLAND CITY, NEW YORK, A CORPORATION OF NEW YORK.

UNITARY SHEET-METAL INCASED BEARING.

Application filed June 11, 1921. Serial No. 476,822.

*To all whom it may concern:*

Be it known that I, FREDERICK E. MUELLER, a citizen of the United States, and resident of the city of Mount Vernon, county of Westchester, and State of New York, have invented certain new and useful Improvements in Unitary Sheet-Metal Incased Bearings, of which the following is a description.

This invention relates to an improved bearing assembly unit and has for its primary object to provide a device of this character whereby the greater part of the machine work usually required in the mounting of shaft bearings of various types may be eliminated. To this end I provide an assembly unit of such construction that the shaft bearing may be accurately positioned and at all times maintained in operative relation to the shaft without boring or reaming the part in which the shaft is supported for the purpose of receiving the outer rings of the bearings.

In one embodiment of my present invention I provide metal cups which may be pressed and drawn with great precision and within which the parts of the shaft bearing are assembled. Owing to the extreme accuracy with which the cup may be formed, a far better fit of the outer bearing ring is possible than can be obtained when this ring is set within a bored or reamed opening in the wall of the shaft supporting part. These cups of pressed sheet metal may be employed in connection with any type of ball or roller bearing with plain sleeve bearings, or with babbitted bearings. In the use of these cups in every case it is unnecessary to ream or finish the face of the opening in the supporting wall through which the cup is disposed and the only machine work which is required is in the finishing of the face of the recess with which the end flange of the cup is engaged so that the cup will be accurately centered.

The present invention has for an additional object to provide means for taking up all axial or end play of the shaft when open type ball bearings are employed, and to provide an assembly which will permit the shaft to be readily withdrawn without necessitating the detachment of the cup from the housing or casing wall.

Finally, it is the purpose of the present improvement to provide a mounting for ball bearings which consists of relatively few parts of simple form, will materially reduce the cost of production of various machines in which such bearings are employed, and can be quickly and accurately assembled and arranged in its operative position upon the shaft.

With the above and other objects in view, the invention consists in the improved bearing assembly unit and in the form, construction and relative arrangement of its several parts, as will be hereinafter more fully described, illustrated in the accompanying drawing and subsequently incorporated in the subjoined claims.

Figure 2:
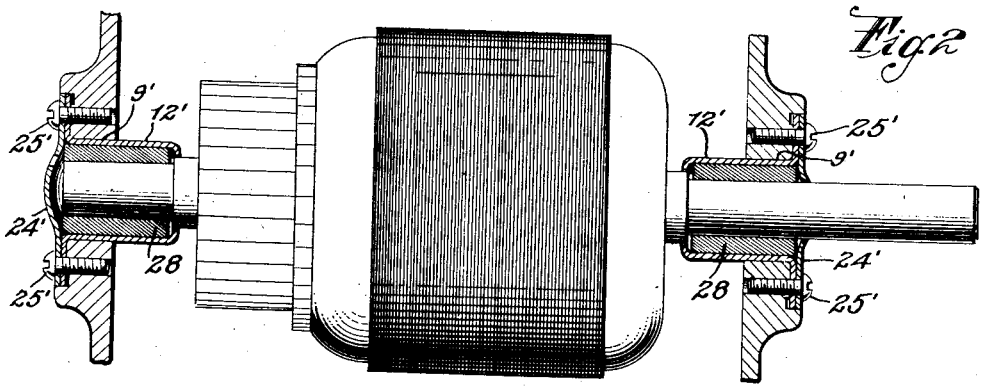

In the drawing, wherein I have illustrated one possible adaptation of the present invention and in which similar reference characters designate corresponding parts throughout the several views:

Figure 1 is a sectional view through the housing of an electric motor showing the bearing assembly for opposite ends of the shaft mounted in the housing walls, and Figure 2 is a sectional view illustrating a modified form of the invention as provided for use in connection with plain or babbitted bearing bushings.

In the drawing I have shown the invention as used in connection with an electric motor for supporting the armature shaft. It will, however, be readily understood that such illustration implies no limitation upon the utility of the device, as it may likewise be readily adapted for use in connection with various other machines.

As herein shown 5 designates the body section of the motor housing or casing which includes the intermediate portion thereof and one end portion. The other section 6 constituting the opposite end of the motor housing is separate and is adpated to be detachably connected to the housing section 5 by means of suitable holding or clamping devices (not shown). The end wall of the section 5 and the wall of the section 6 of the housing are each provided upon its outer face with a central boss 7 and 8 respectively. Through these housing walls in concentric relation to each boss an opening 9 is formed. The circumferential face of this opening is unfinished and the only machine work of an accurate character which is required is in the finishing of the face of the recess 10 which is formed in the face of the boss 8. Through each boss in spaced relation to the edge of the opening 9 additional threaded openings 11 are formed.

My improved bearing assembly as illustrated in figure 1 of the drawing, includes a cup 12 which is accurately formed of the required dimensions by a pressing and drawing operation. This cup at one of its ends has a wall 13 provided with a central opening to receive the armature shaft 14. Upon the opposite end of the body wall of said cup an outwardly extending annular flange 15 is formed. This flange is adapted to be seated against the finished face of the recess 10 and is provided with openings to register with the threaded openings 11 in the housing wall. Within the inner closed end of the housing an annular gasket 16 of felt or other suitable material is disposed and a metal washer plate 17 snugly fitting within the cup is engaged against the face of this gasket.

Within the cup 12 the ball bearing of the open type is illustrated. This bearing includes an inner ring 18 engaged upon the reduced portion of the armature shaft 14 and an outer ring 19 which has a snug frictional fit within the cup 12. Between these inner and outer rings the cage, carrying bearing balls 20, is disposed. A pressed sheet metal part 21 is positioned within the outer end of the cup 12 and has an inwardly extending flange fitting against the outer face of the bearing ring 19. Within the marginal flange 22 of the part 21, which has a light frictional fit within the end of the cup 12, an oil retaining ring 23 of felt or other material is engaged. Finally, a retaining plate 24 is engaged against the flange 15 of the cup, the recess 10 being of sufficient depth to receive the marginal edge of this plate, the face of which is flush with the face of the boss 8. The retaining plate is also provided with openings registering with openings in the flange 15 and through these coinciding openings the screws 25 are disposed and threaded in the openings 11 of the housing. The face of the recess 10 is provided at its outer side with an annular channel or undercut groove 10' to accommodate any burrs or projections on the edge of the cup flange 15' and thus insure a true and exact seating of the flange against the finished face of the recess.

The bearing assembly for one end of the armature shaft includes a spring 26 which surrounds the oil retaining plug 23' the said plug being of somewhat greater thickness than the gasket for the bearing assembly on the opposite end of the shaft. This spring functions to take up all axial or end play of the shaft.

In assembling, the end section 6 of the housing is first assembled upon one end of the motor shaft, said shaft extending through the cup 12 mounted in the section 6 of the housing. The sleeve 27 is engaged upon the inner portion of the shaft and extends through the gasket 16 and the washer plate 17 which are enclosed within the cup 12. The inner race ring 18 of the bearing is then fitted upon the reduced end of the shaft. The shaft end is now engaged through the opening in the end wall of the cup 12 and the cage with the bearing balls 20 therein, is then threaded over the end of the armature shaft on the inner ring of the bearing. The outer race ring of the bearing is now placed in position, the same having a proper fit in the cup and is followed by the sheet metal part 21. The oil retaining ring 23 is applied with the part 21 and finally the retaining or cover plate 24 is positioned over the outer end of the cup and engaged in the recess 10 upon the cup flange. This retaining plate and the cup flange are rigidly secured to the housing section 6 by means of the screw 25. The armature with the housing section 6 is now positioned in the housing section 5 and said section securely bolted or clamped together with the armature shaft extending through the opening in the end wall of the cup 12 on the section 5 of the housing. The parts of the bearing for this end of the armature shaft corresponding with those above referred to are then assembled in a similar manner. In this case, however, a plug of felt or other absorbent material 23' is employed and serves as an oil reservoir. The spring 26 is then disposed within the outer end of the cup and the cover plate 24 finally applied. With the exception of the form of the oil retainer 23' and the spring 26, the bearing assembly for this end of the armature shaft is identical with that for the shaft end mounted in the housing section 6. It will be noted that the cups 12 for each of the bearings are concentrically spaced from the wall of the opening 9. As soon as the bearing assembly is completed, the cups 12 being packed with a medium grade of grease during the assembling of the parts, the motor is ready to be tested. I have illustrated in the drawing the open type of ball bearing, but it will, of course, be apparent that other types of ball or roller bearings can be used as well.

In order to disassemble the motor, it is only necessary to detach the housing section 6 and by then displacing either this section, or the section 5 of the housing, the armature may be withdrawn through the shell or housing, in which process the cage with the bearing balls are stripped off of the inner race ring 18. In order to reassemble the parts, it is necessary to remove both outer bearing rings and then reassemble the several parts thereof in the manner above explained.

In Figure 2 of the drawing, I have shown an alternative embodiment of the invention, in which the cups 12' for each bearing assembly are of somewhat less diameter than those shown in Figure 1 and in each of these cups, before they are mounted in the housing wall, a plain or babbitted bearing bushing 28 is fitted. The outer end of the cup is flanged and engaged with the face of the recess in the bearing wall, as shown in Figure 1, and the retaining or cover plate 24' is then also arranged in the recess, and said plate and cup fixed to the housing wall by the screws 25'. In this case, it will be observed that there is no clearance between the cylindrical wall of the cup 12' and the face of the opening 9' through the housing wall. Thus the housing wall snugly surrounding the cup provides adequate support therefor. However, in many cases it is desirable to eliminate this close fit, when, as seen in Figure 1, a clearance is provided between the wall of the cup and the face of the opening. In the arrangement shown in Figure 2, the retaining plates 24' may be assembled with the cups 12' before the latter are inserted through the openings in the housing wall and finally fixed in position. Likewise, these parts including the bearing bushings 28 may be readily arranged upon or removed from the shaft without in any way disturbing the relative arrangement of the several parts.

While I have illustrated and described an open type of ball-bearing, the present invention is obviously also adapted for use in connection with the closed type bearing. In the latter case it is usual to provide a retaining nut coacting with the inner bearing ring and which secures the bearing in its operative position on the shaft. When this nut is removed, the bearing may be readily removed from the shaft. In the use of the closed type bearing in connection with the sheet metal cup 12, when the cup is removed from the opening in the supporting wall, the bearing is also removed as a unit therewith and stripped from the shaft. When the open type bearing is employed, in the removal of the cup, the outer ring of the bearing moves therewith and the ball-retaining cage is engaged by the washer plate 17 as the cup is withdrawn and stripped from the inner ring of the bearing.

From the foregoing description, considered in connection with the accompanying drawings, the construction, arrangement and several advantages of the described embodiments of the invention will be fully understood. It will be evident that by the provision of pressed sheet metal cups within which the parts of the bearing are assembled, the machine work heretofore necessary in the mounting of ball bearings for the shafts of motors and various other machines is to a large extent obviated. At the same time, however, the improved bearing assembly unit, as herein disclosed, provides means whereby the bearing is at all times accurately supported and maintained in proper relation to the shaft. The parts of the unit are of very simple form so that they can be accurately constructed with a minimum of skilled machine work. The complete assembly units, together with the parts of the bearing proper, can be manufactured and sold at comparatively small cost and readily assembled in operative position or disassembled when required.

While I have herein disclosed several desirable and satisfactory embodiments of the invention, it will, nevertheless, be understood that the device may also be embodied in numerous other alternative constructions and I accordingly reserve the privilege of adopting all such legitimate changes as may be fairly embodied within the spirit and scope of the invention as claimed.

I claim:

1. A unitary sheet metal incased bearing comprising a sheet metal cup having an opening adapted to receive a shaft, a shaft bearing within said cup, and means for detachably securing said cup to a support, said cup and bearing being immediately removable as a unit from said support on release of said securing means.

2. A unitary sheet metal incased bearing comprising a sheet metal cup having an opening adapted to receive a shaft, a shaft bearing and lubricating means within said cup, and means for detachably securing said cup to a support, said cup and bearing and lubricating means being immediately removable as a unit from said support on release of said securing means.

3. A unitary sheet metal incased bearing comprising a sheet metal cup having an opening adapted to receive a shaft, a shaft bearing and packing within said cup, and means for detachably securing said cup to a support, said cup, bearing and packing being immediately removable as a unit from said support on release of said securing means.

4. A unitary sheet metal incased bearing comprising a sheet metal cup having an opening adapted to receive a shaft, a shaft bearing, packing and lubricating means within said cup, and means for detachably securing said cup to a support, said cup, bearing, packing and lubricating means being immediately removable as a unit from said support on release of said securing means.

5. A unitary sheet metal incased bearing comprising a sheet metal cup having an outward flange adapted to fit a seat on a supporting wall and an inward flange forming a wall provided with shaft opening, a shaft bearing disposed within said cup, and means adapted to engage said outward flange for detachably securing said cup to said wall seat, said cup and bearing being immediately removable as a unit from said support on release of said securing means.

6. A unitary sheet metal incased bearing comprising a sheet metal cup having an opening to receive a shaft, a shaft bearing within said cup, and means for mounting said cup at its other end upon a supporting wall and sustaining said cup in operative position with its body wall out of contact with the supporting wall.

7. A unitary sheet metal incased bearing comprising a sheet metal cup having an outward flange at one end and an inward flange at the other end forming an end wall provided with a shaft opening, a shaft bearing disposed within said cup, and means adapted to engage said outward flange for detachably securing said cup to a supporting wall and sustaining said cup in operative position with its body wall out of contact with the supporting wall, said cup and bearing being immediately removable as a unit from said support on release of said securing means.

8. A unitary sheet metal incased bearing comprising a sheet metal cup having an end wall provided with a shaft receiving opening, a shaft bearing fitted within said cup and spaced from said end wall, an annular gasket between said bearing and said end wall, and means for detachably securing said cup to a supporting wall, said cup bearing and gasket being immediately removable as a unit from said support on release of said securing means.

9. A unitary sheet metal incased bearing comprising a sheet metal cup having an end wall provided with a shaft receiving opening said cup being open at its other end, a shaft bearing adapted to be fitted within said cup, and means for mounting said cup at its latter end upon a supporting wall and sustaining said cup in operative position with its body wall out of contact with the supporting wall.

10. A unitary sheet metal incased bearing comprising a cup having an end wall provided with a shaft receiving opening, a shaft bearing fitted within said cup and spaced from said end wall, lubricant supply means within the cup at the outer side of the bearing, and means for closing the outer end of the cup and confining said lubricant supply means therein.

11. A unitary sheet metal incased bearing comprising a pressed sheet metal cup having an end wall provided with a shaft receiving opening, a packing gasket and a retaining washer therefor adapted to be arranged within the cup against said end wall, said cup being open at its other end and having an outwardly extending flange formed thereon adapted to be secured upon a finished seating face provided upon a supporting wall through which said cup is positioned, a shaft bearing fitted within said cup, a pressed sheet metal annular member engaged against the outer side of said bearing, an absorbent oil retainer engaged with said member, a spring engaged at its inner end with said member, and a cover plate closing the open end of the cup and providing a bearing for the outer end of said spring, 12. A unitary sheet metal incased bearing comprising a pressed sheet metal cup having an end wall provided with a shaft receiving opening, a packing gasket and retaining washer adapted to be fitted within the cup against said end wall, the other end of said cup being open and having an outwardly extending flange formed thereon adapted to be secured upon a finished seating face provided upon a supporting wall through which said cup is positioned, a ball bearing including inner and outer race rings and an interposed ball carrying cage adapted to be positioned within said cup, an annular pressed sheet metal member adapted to be fitted within the open end of the cup against the outer race ring of the bearing, an oil retaining plug engaging the outer face of said member, a spring bearing at its inner end against said annular member, and a cover plate closing the open end of the cup and providing a bearing for the outer end of said spring.

13. A unitary sheet metal incased bearing comprising a support having a shaft receiving opening and an annular recess in one side of said support surrounding the opening and provided with a finished face, a unitary sheet metal incased bearing comprising a pressed sheet metal cup having an end wall provided with an opening to receive the shaft and adapted to be disposed through the opening in the support in spaced concentric relation to the circumferential face thereof, said cup being open at its other end and formed with an outwardly extending annular flange to be positioned in said recess and against the finished face thereof, a shaft bearing adapted to be positioned within said cup, a cover plate for the open end of said cup, and a common means for rigidly securing the cover plate and the cup flange to said support.

14. The combination of a support having a shaft receiving opening and an annular recess in one side of said support surrounding the opening and provided with a finished face having an annular groove at the outer side thereof, a unitary sheet metal incased bearing comprising a pressed sheet metal cup having an end wall provided with an opening to receive the shaft and adapted to be disposed through the opening in the support in spaced concentric relation to the circumferential face of said opening, said cup being open at its other end and formed with an outwardly extending annular flange to be positioned in said recess and against the finished face thereof and overlying said annular groove, a shaft bearing adapted to be positioned within said cup, a cover plate for the open end of said cup, and a common means for rigidly securing the cover plate and the cup flange to said support.

15. The combination of a supporting wall having an opening, a sheet metal cup adapted to be positioned through said opening in spaced relation to the circumferential face thereof, means for detachably securing said cup in fixed position relative to said wall, and a shaft bearing fitted within said cup.

16. In combination with a supporting wall having an opening, a pressed metal bearing retainer adapted to be positioned through said opening and accurately formed to receive a bearing, and a means located exteriorly of said opening and coacting with said wall operative to constitute the sole support for said retainer to retain the same in position relative to the longitudinal face of said opening.

In testimony that I claim the foregoing as my invention, I have signed my name hereunder.

FREDERICK E. MUELLER.